United States Patent
Yamamoto

(10) Patent No.: US 6,960,903 B2
(45) Date of Patent: Nov. 1, 2005

(54) TROUBLE DETERMINING APPARATUS FOR DC BOOSTING CIRCUIT

(75) Inventor: Akira Yamamoto, Takahama (JP)

(73) Assignees: Favess Co., Ltd., Okazaki (JP); Toyoda Koki Kabushiki Kaisha, Kariya (JP); Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/887,811

(22) Filed: Jul. 12, 2004

(65) Prior Publication Data

US 2005/0024032 A1  Feb. 3, 2005

(30) Foreign Application Priority Data

Jul. 30, 2003  (JP) ............................. 2003-282697

(51) Int. Cl.[7] ............................................. G05F 1/40
(52) U.S. Cl. .................................................... 323/282
(58) Field of Search ............................. 323/222, 282, 323/283, 285, 351; 307/10.1, 10.7; 361/23

(56) References Cited

U.S. PATENT DOCUMENTS

| | | | |
|---|---|---|---|
| 5,528,087 A * | 6/1996 | Sibata et al. | 307/66 |
| 5,659,241 A * | 8/1997 | Horiuchi et al. | 323/222 |
| 6,058,035 A * | 5/2000 | Madenokouji et al. | 363/95 |
| 6,580,252 B1 * | 6/2003 | Yu | 323/222 |
| 6,870,328 B2 * | 3/2005 | Tanabe et al. | 315/291 |

FOREIGN PATENT DOCUMENTS

| EP | 0 780 950 | 6/1997 |
|---|---|---|
| EP | 1 293 413 | 3/2003 |

* cited by examiner

Primary Examiner—Adolf Berhane
(74) Attorney, Agent, or Firm—Oblon, Spivak, McClelland, Maier & Neustadt, P.C.

(57) ABSTRACT

A trouble determining apparatus for a chopper type DC boosting circuit capable of determining whether or not a switching device is in trouble securely and quickly and when the switching circuit is in trouble, preventing other circuit from being in a trouble. Upon determining a short-circuit trouble of a transistor Q, a boosting circuit control unit 22 is turned OFF a power relay RL and then determines whether or not a voltage VP1 of a connecting point P1 rises over a first set voltage VS1 by the time when a first predetermined time t1 elapses since an ignition switch IG is turned ON with the transistor Q set to OFF. Upon determining an open trouble of the transistor Q, the boosting circuit control unit 22 determines whether or not the voltage VP1 of the connecting point P1 falls below a second set voltage by the time when a second predetermined time t2 elapses since the transistor Q is turned ON with the power relay RL set to OFF and whether or not the voltage VP1 falls from a state before the transistor Q is turned ON by more than a third set voltage.

4 Claims, 4 Drawing Sheets

TROUBLE DETERMINING APPARATUS FOR DC BOOSTING CIRCUIT

CROSS-REFERENCE TO RELATED APPLICATION

The present application claims priority under 35 U.S.C. § 119 to Japanese Patent Application No. JP2003-282697. The contents of these applications are incorporated herein by reference.

BACKGROUND OF THE INVENTION

1. Field of the Invention

The present invention relates to a trouble determining apparatus for DC boosting circuit and more particularly to an apparatus for determining a trouble in a switching device of a chopper type DC boosting circuit.

2. Description of the Related Art

Conventionally, the chopper type DC boosting circuit has been widely used in which by turning ON/OFF a current flowing through a boosting coil from a DC power supply with the switching device, back electromotive force generated in a boosting coil is accumulated in a smoothing capacitor through a rectifying diode so as to boost the voltage of the DC power supply. In an electric power steering apparatus for assisting an operation of the power steering wheel using a rotation of an electric motor, for example, there has been proposed such a technology that by boosting the DC voltage of a vehicle loaded battery by means of the chopper type DC boosting circuit and then supplying that boosted voltage to the electric motor to drive the same motor, the amount of current supplied to that electric motor is reduced thereby achieving reductions in capacity of used wires (reducing the diameter of the wire) and size of the electric motor. The applicant of this application invented a chopper type DC boosting circuit suitable for such an electric power steering apparatus (see patent document 1).

[Prior Art]

JP 2003-89360 A (Page 9, FIG. 4) is incorporated herein by reference.

(Configuration of Conventional Chopper Type DC Boosting Circuit)

FIG. 4 is a circuit diagram showing a conventional chopper type DC boosting circuit 60 used in the electric power steering apparatus. The electronic control unit (ECU) 50 of the electric power steering system (EPS) includes a chopper type DC boosting circuit 60. The conventional chopper type DC boosting circuit 60 comprises a power relay RL, a smoothing capacitor C1, a noise filter capacitor C2, a boosting coil L, a transistor Q, a rectifying diode D and a boosting circuit control unit 62. The positive terminal of the vehicle loaded battery B is connected to the ECU 50 through a fuse F while the grounding terminal of the ECU 50 is connected to the negative terminal of the vehicle loaded battery B. The transistor Q which is a switching device is composed of N-channel power metal oxide semiconductor field effect transistor (MOS FET). As the power relay RL, it is permissible to use any one of an electromagnetic relay using an electric magnet and a non-contact relay using a semiconductor switch.

(Switching Device Trouble Determination in a Conventional Chopper Type DC Boosting Circuit)

If in the conventional chopper type DC boosting circuit 60, the transistor Q which is a switching device is in trouble, normal boosting operation is disabled. Thus, the trouble determination in the transistor Q is necessary. For the reason, the boosting circuit control unit 62 has a function for determining a trouble in the transistor Q. The troubles in the transistor Q include open trouble and short-circuit trouble. The open trouble refers to a trouble that a state between the source and drain turns open regardless of a gate voltage (even if a high level driving signal is applied to the gate in order to turn ON the transistor Q which is a N channel, the transistor Q keeps OFF). The short-circuit trouble is a trouble that a short-circuit occurs between the source and drain regardless of the gate voltage (even if a low-level driving signal is applied to the gate in order to turn the transistor Q of the N channel OFF, the transistor Q keeps ON).

(Determining Operation for Short-circuit Trouble)

The boosting circuit control unit 62 executes the determination operation on a short-circuit trouble of the transistor Q before starting the boosting operation by turning ON/OFF the transistor Q. That is, the boosting circuit control unit 62 first is turned ON the power relay RL and at the same time, is turned OFF the transistor Q and next detects a voltage VP1 at a connecting point P1. The boosting circuit control unit 62, if the voltage VP1 is less than a reference voltage VSa, determines that a short-circuit trouble occurs in the transistor Q and if the voltage VP1 is over the reference voltage VSa, determines that the transistor Q is not in short-circuit trouble. That is, if the transistor Q is in the short-circuit trouble, the voltage VP1 of the connecting point P1 is determined by the voltage VB of the vehicle loaded battery B, a resistance of the fuse F, a DC resistance of the boosting coil L and an ON resistance of the transistor Q, because the connecting point P1 is grounded through the boosting coil L and the transistor Q. Then, if the voltage VP1 in the case where the short-circuit trouble occurs in the transistor Q is experimentally obtained and the reference voltage VSa is set to that obtained voltage VP1, the short-circuit trouble of the transistor Q can be determined.

(Determining Operation of the Open Trouble)

After the boosting operation is started by turning ON/OFF the transistor Q, the boosting circuit control unit 62 executes the determining operation upon the open trouble of the transistor Q. That is, the boosting circuit control unit 62 first is turned ON the power relay RL and executes the boosting operation by repeating the ON/OFF operation of the transistor Q, and after that, detects an output voltage VO. If the output voltage VO is equal to the voltage VB of the vehicle loaded battery B and no boosting is carried out, the boosting circuit control unit 62 determines that the transistor Q is in the open trouble and if the output voltage VO is higher than the voltage VB, the boosting circuit control unit 62 determines that the transistor Q is not in the open trouble.

(Problems of the Conventional Determination on Switching Trouble)

The conventional determination on a trouble in the transistor Q by means of the boosting circuit control unit 62 has following problems.

1) When the transistor Q is in the short-circuit trouble, if the power relay RL is turned ON to determine a short-circuit trouble, a rush current flows through a path of vehicle loaded battery B—fuse F—power relay RL—boosting coil L—transistor Q. This rush current is a very large current value even if a noise filter capacitor C2 is provided. For the reason, there is such a problem that a circuit device (fuse F, power relay RL, noise filter capacitor C2, boosting coil L) through which the rush current flows is heated abnormally thereby leading to a trouble. For example, if a non-contact relay is used for the power relay RL, the semiconductor switch can be in the open trouble or short-circuit trouble due to the rush current. Because the power relay RL cannot be turned OFF if the semiconductor switch of the power relay RL is in the short-circuit trouble, the fuse F may melt down due to the rush current. That is, if the non-contact relay is used for the power relay RL, there may occur such double defects that the semiconductor switch of the power relay RL is in the short-circuit trouble and the fuse F melts down due to the rush current. Further, if an electromagnetic relay is used for the power relay RL, there is a fear that the relay contact may be fused due to the rush current. Because the power relay RL cannot be turned OFF if the relay contact of the power relay RL is fused, the fuse F may melt down due to the rush current. That is, if the electromagnetic relay is used for the power relay RL, double defects that the relay contact of the power relay RL is fused and the fuse F melts down due to the rush current may occur. If such double defects occur, which a troubled section exists in the power relay RL or the fuse F cannot be specified, thereby taking a long time for restoration from that trouble.

2) To determine an open trouble of the transistor Q, whether or not the output voltage VO rises over the voltage VB of the vehicle loaded battery is detected by executing the boosting operation by repeating the ON/OFF action of the transistor Q. At this time, to improve the determination accuracy on the open trouble of the transistor Q, it needs to be determined that the transistor Q is not in the open trouble first when the output voltage VO becomes higher than the voltage VB only by the amount corresponding to a margin of a detection error. Thus, the ON/OFF action of the transistor Q needs to be continued until the output voltage VO becomes higher than the voltage VB only by the amount corresponding to the margin of the detection error, so that it takes a long time to obtain a determination result on the open trouble of the transistor Q.

SUMMARY OF THE INVENTION

The present invention has been achieved to solve the above-described problem and an object of the invention is to provide a trouble determining apparatus for a chopper type DC boosting circuit capable of determining whether or not the switching device is in trouble securely and quickly and when a switching device is in a trouble, preventing other circuits from getting into a trouble.

To solve the above-described problems, the present invention adopts a means according to a first aspect thereof. Because according to the first aspect, whether or not the switching device is in a short-circuit trouble is determined based on changes in a between-terminal voltage of a second capacitor determined by the charge characteristic of the second capacitor, with a time passage whether or not the short-circuit trouble exists can be determined securely and quickly. Further, because according to the first aspect, an interrupting means interrupts a current supplied from a DC power supply to an inductor when determining whether or not the switching device is in the short-circuit trouble, no excessive current flows from the DC power supply into the chopper type DC boosting circuit when the switching device is in the short-circuit trouble, thereby preventing other circuit devices (interrupting means, inductor, second capacitor) from being in a trouble due to that excessive current.

Further, the present invention adopts a means according to a second aspect thereof. Because according to the second aspect, whether or not the switching device is in the open trouble based on changes in the between-terminal voltage of the second capacitor determined by the discharge characteristic of the second capacitor with a time passage, whether or not the open trouble exists can be determined securely and quickly.

Further, the present invention adopts a means according to the third aspect thereof. Because according to the third aspect, if the between-terminal voltage of the second capacitor rises over the first set voltage, it is determined that the switching device is not in the short-circuit trouble by the time when a first predetermined time elapses since the supply of current from a current supply means starts, the effect of the first aspect can be secured.

Further, the present invention adopts a means according to a fourth aspect thereof. According to the fourth aspect, upon determining the open trouble of the switching device, it is determined that the switching device is not in the open trouble only when both a first condition and a second condition are satisfied. Here, the first condition is that the between-terminal voltage of the second capacitor has fallen below the second set voltage by the time when a second predetermined time elapses since the control means controls the switching device to be ON. Further, the second condition is that by the time when the second predetermined time elapses since the control means controls the switching device to be ON, the between-terminal voltage of the second capacitor fallen from a state before the switching device is controlled to be ON by more than the third set voltage. Setting these two conditions enable to determine whether or not the switching device is in the open trouble.

Description of Reference Numerals

Correspondence relation between components described in Claims and those in specification is as follows. The direct current power supply may correspond to the vehicle battery B. The inductor may correspond to the boosting coil L. The switching device may correspond to the transistor Q. The rectifier may correspond to a rectifying diode D. The first capacitor may correspond to a smoothing capacitor C1. The second capacitor may correspond to the noise filter capacitor C2. The control means may correspond to the boosting circuit control unit 22. The interrupting means may correspond to a processing of S102 executed by the power relay RL and the boosting circuit control unit 22. The current supply means comprises the vehicle loaded battery B, an ignition switch IG, an internal power circuit 12 and a resistor R. The short-circuit trouble determining means may correspond to processings of S110–S114 executed by the boosting circuit control unit 22. The between-terminal voltage of the second capacitor may correspond to the voltage VP1 of the connecting point P1. The open trouble determining means may correspond to processing of S120–S124 executed by the boosting circuit control unit 22. "By the time when the first predetermined time elapses since the current supply means starts supply of current" means that the first predetermined time t1 elapses since the ignition switch IG is turned ON (by the time when the first predetermined time t1 elapses since the supply of current from the internal power circuit 12 to the connecting point P1 through the resistor R starts).

DESCRIPTION OF THE PREFERRED EMBODIMENTS

Figure 1:
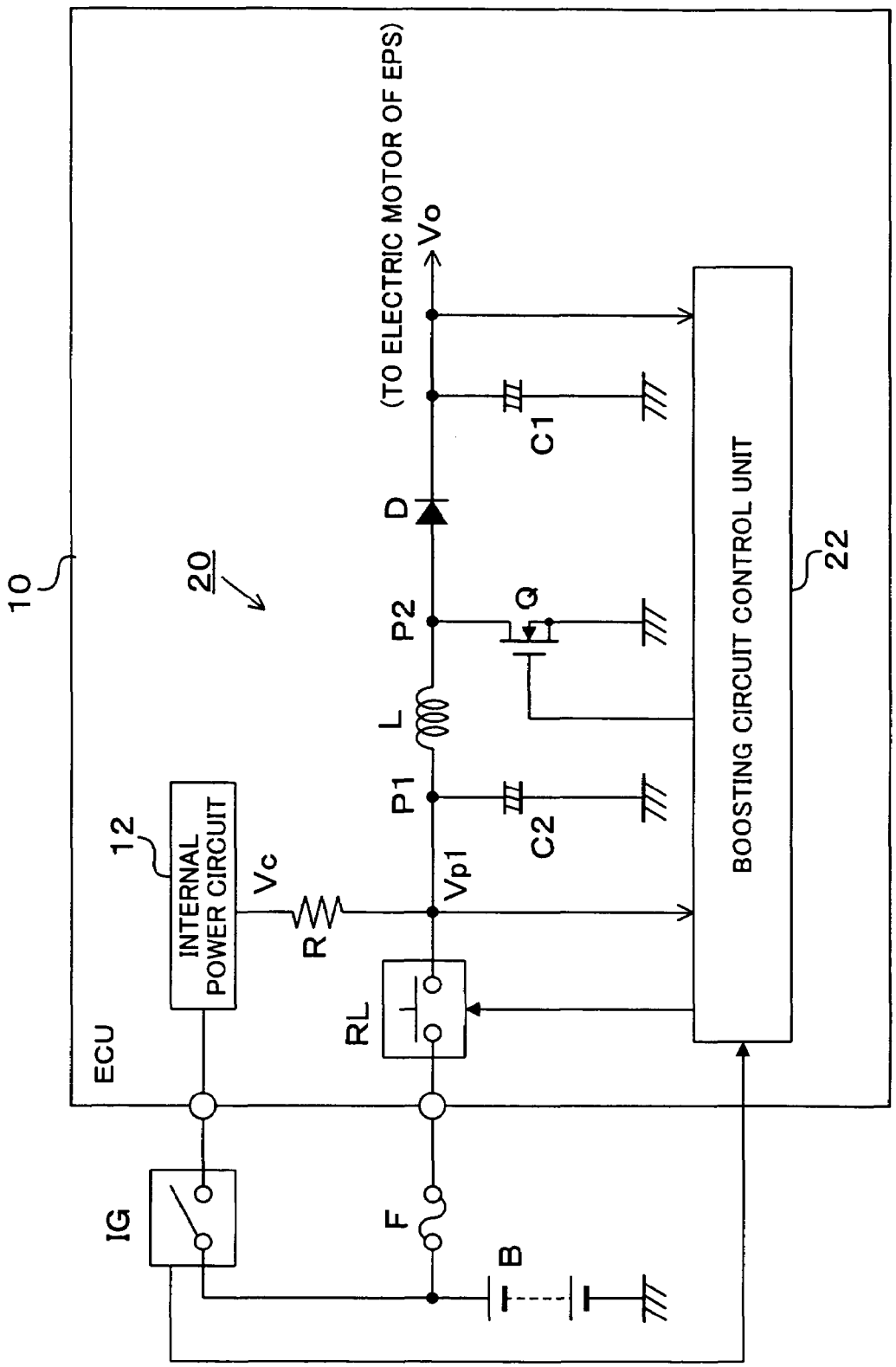
FIG. 1 is a circuit diagram showing a chopper type DC boosting circuit 20 according to a first embodiment of the present invention.
Figure 4:
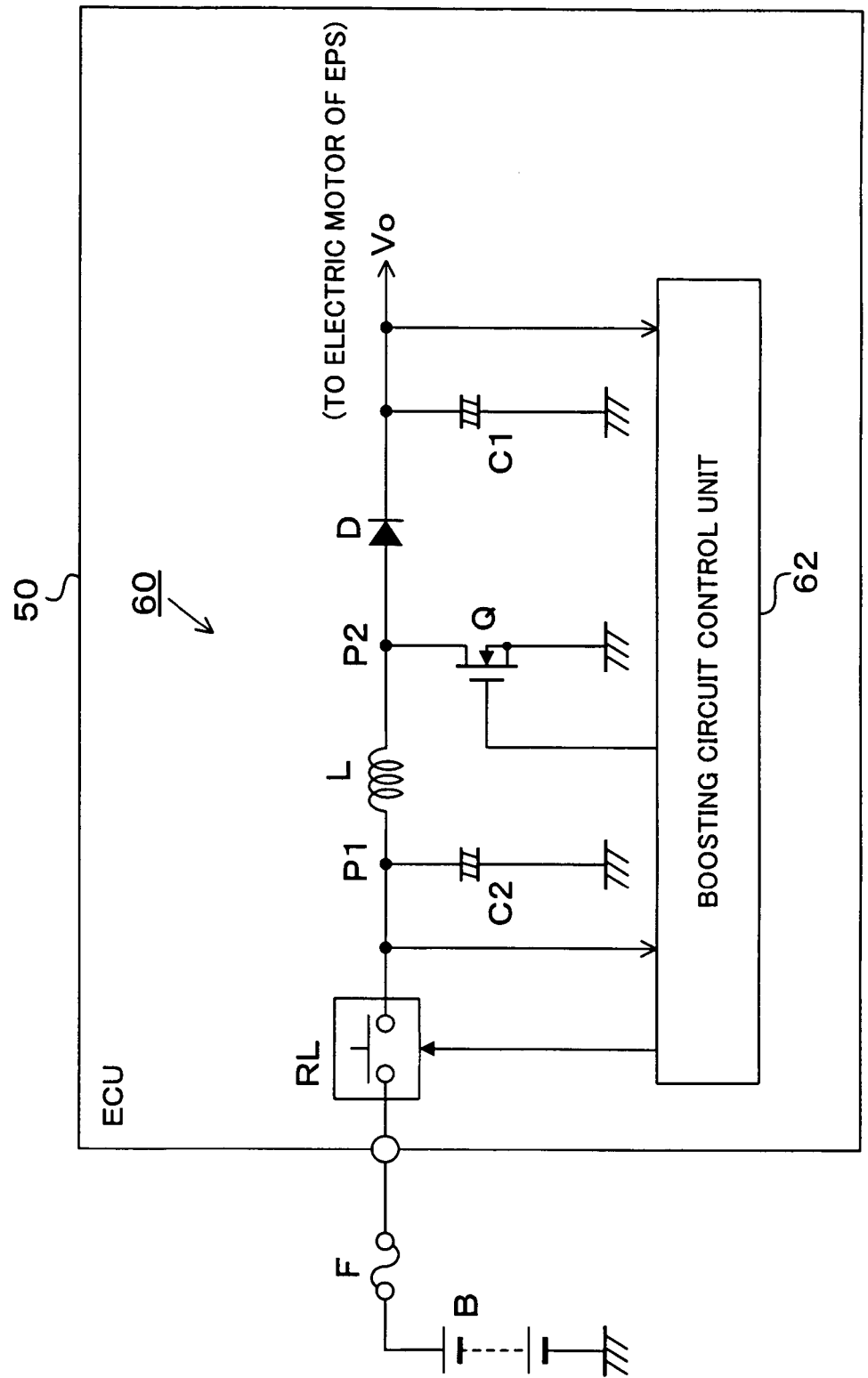
FIG. 4 is a circuit diagram showing a conventional chopper type DC boosting circuit 60.

Hereinafter, the trouble determining apparatus for the chopper type DC boosting circuit of a preferred embodiment of the present invention will be described with reference to the accompanying drawings. Like reference numerals are attached to the same components as the conventional technology shown in FIG. 4 and description thereof is omitted. FIG. 1 is a circuit diagram showing the chopper type DC boosting circuit 20 of this embodiment used in the electric power steering system. The chopper type DC boosting circuit 20 is different from the conventional chopper type DC boosting circuit 60 shown in FIG. 4, as following:

(1) The chopper type DC boosting circuit 20 is provided within the ECU 10 of the EPS (not shown) and includes the boosting circuit control unit 22. The boosting circuit control unit 22 controls ON/OFF of the power relay RL. Further the boosting circuit control unit 22 generates a drive signal for controlling ON/OFF (switching) of the transistor Q based on the output voltage VO of the chopper type DC boosting circuit 20 and applies that drive signal to the gate of the transistor Q. Then, the boosting circuit control unit 22 detects a voltage of the connecting point P1 and the output voltage VO and detects the ON/OFF state of an ignition switch IG of a vehicle.

(2) The positive terminal of the vehicle loaded battery B is connected to the ECU 10 through the ignition switch IG. An internal power circuit 12 and a resistor R are provided within the ECU 10. The internal power circuit 12 lowers the DC voltage VB supplied from the vehicle loaded battery B when the ignition switch IG is turned ON so as to generate a DC voltage VC and supplies that DC voltage VC to respective circuit device within the ECU 10.

(3) The resistor R is connected between a connecting point P1 of the power relay RL with the boosting coil L and the internal power circuit 12. That is, the DC voltage VC generated by the internal power circuit 12 is applied to the connecting point P1 through the resistor R. Thus, the voltage of the connecting point P1 is pulled up to the DC voltage VC through the resistor R. Then, a pull-up circuit is constituted of the internal power circuit 12 and the resistor R.

Boosting Operation of the Chopper Type DC Boosting Circuit of this Embodiment

In the boosting operation of the chopper type DC boosting circuit 20, the boosting circuit control unit 22 performs the same operation as the boosting circuit control unit 62 of the conventional chopper type DC boosting circuit 60.

Switching Device Trouble Determination in the Chopper Type DC Boosting Circuit of this Embodiment In the chopper type boosting circuit 20, a trouble in the transistor Q needs to be determined because normal boosting operation is disabled if the transistor Q which is a switching device is in trouble. Thus, the boosting circuit control unit 22 has a trouble determining function for the transistor Q.

Figure 2:
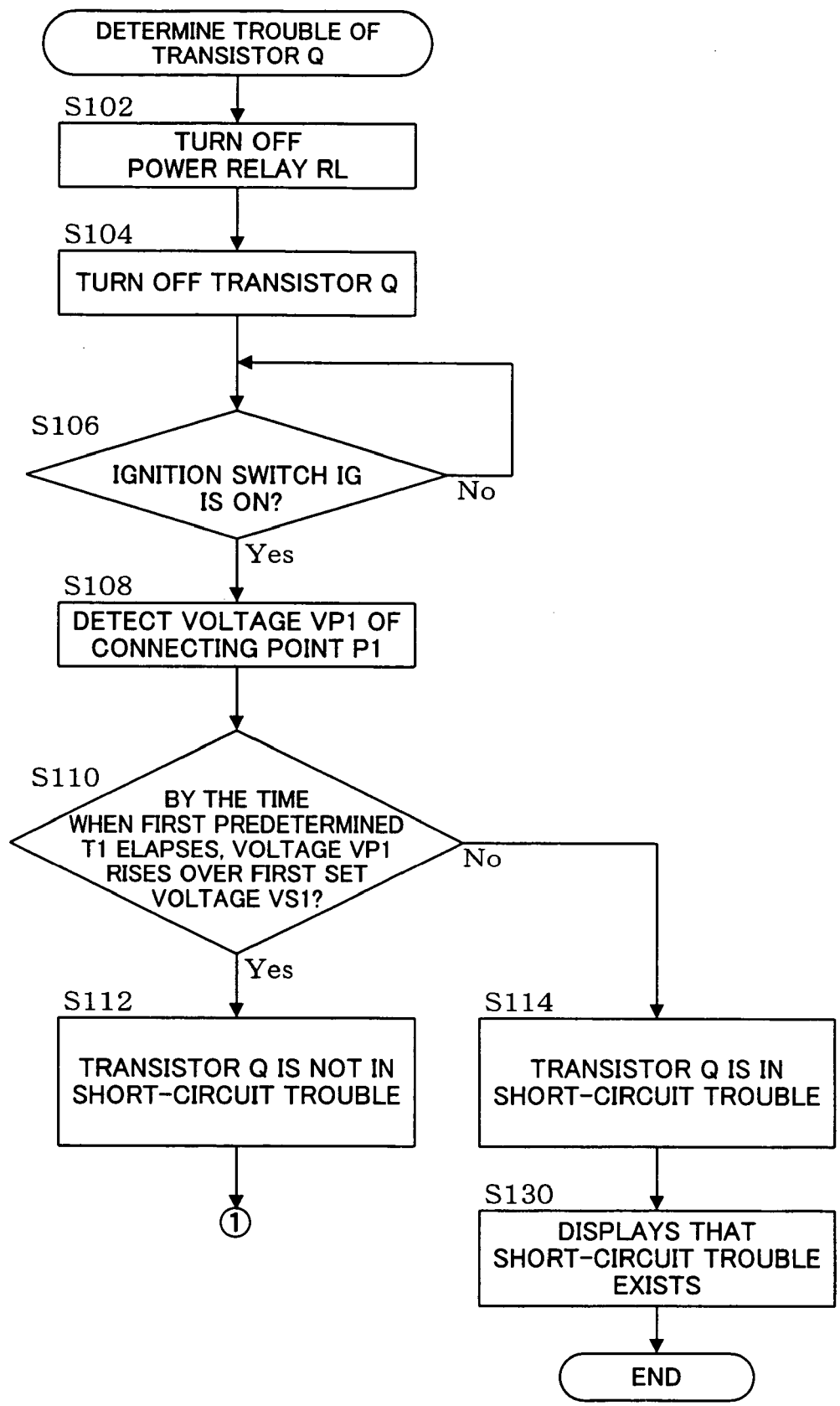
FIG. 2 is a flow chart showing the flow of the trouble determining operation on the transistor Q executed by the boosting circuit control unit 22 of an embodiment.
Figure 3:
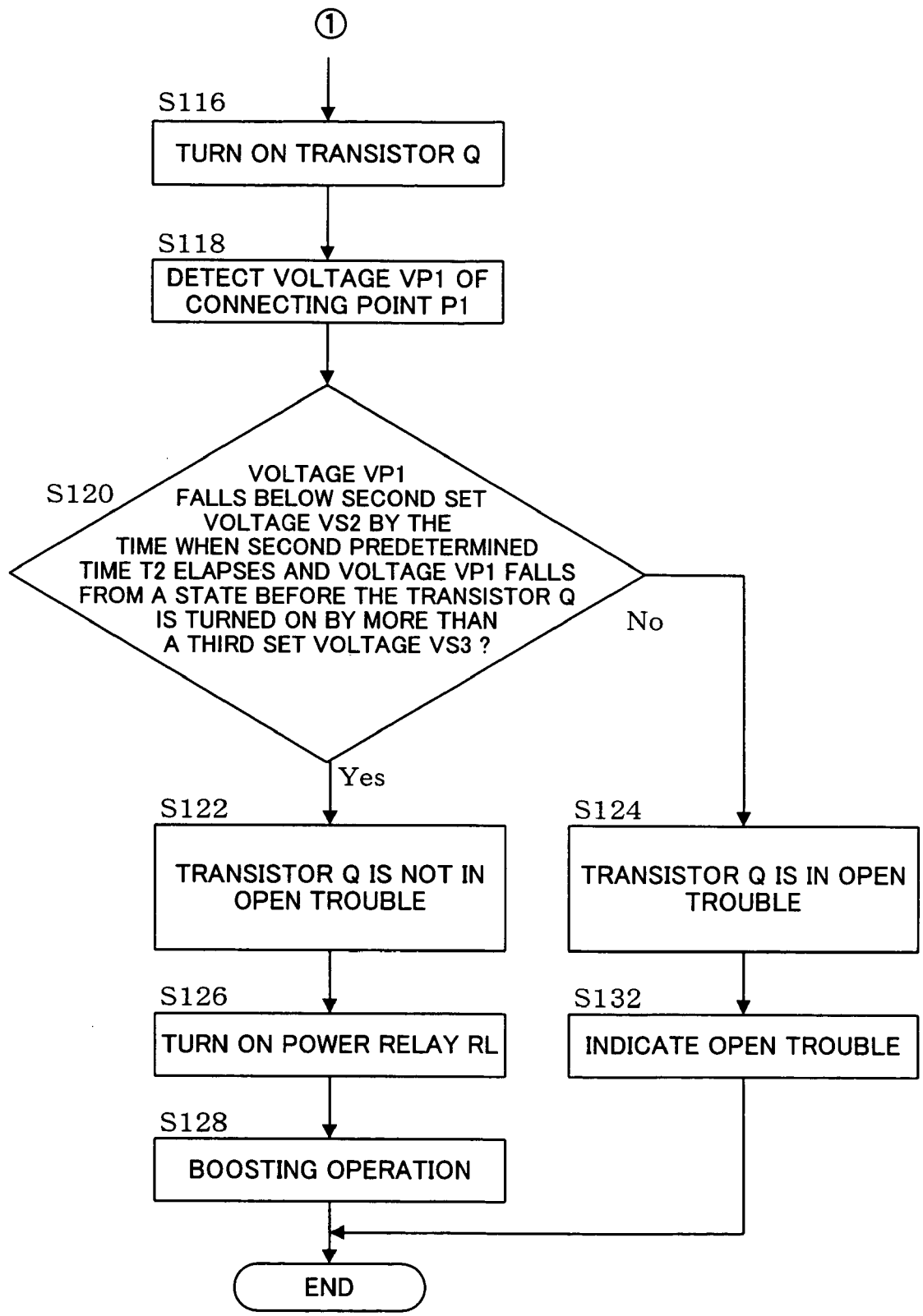
FIG. 3 is a flow chart showing the flow of the trouble determining operation on the transistor Q executed by the boosting circuit control unit 22 of an embodiment.

FIGS. 2, 3 are flow charts showing the flow of the trouble determining operation for the transistor Q which is carried out by the boosting circuit control unit 22. The boosting circuit control unit 22 is constituted of a computer containing a CPU, ROM, RAM and I/O circuit (hereinafter referred to as microcomputer (not shown)) and the processing of each step (hereinafter referred to as S) is carried out by various kinds of arithmetic operations by computer system according to a computer program recorded in the ROM incorporated in that microcomputer. In an initial state, the boosting circuit control unit 22 turns OFF the power relay RL (S102) and then turns OFF the transistor Q by applying a low-level drive signal to the gate of the N-channel transistor Q (S104). Next, the boosting circuit control unit 22 detects to see whether or not the ignition switch IG is turned ON (S106) and if the ignition switch IG is turned ON (S106: YES), the voltage VP1 of the connecting point P1 is detected (S108). The voltage VP1 of the connecting point P1 is a between-terminal voltage of a noise filter capacitor C2. Then, the boosting circuit control unit 22 determines whether or not the voltage VP1 of the connecting point P1 rises over a first set voltage VS1 by the time when a first predetermined time t1 elapses since the ignition switch IG is turned ON (S110). If the voltage VP1 rises over the first set voltage VS1 by the time when the first predetermined time t1 elapses since the ignition switch IG is turned ON according to the determination result (S110: Yes), the boosting circuit control unit 22 determines that the transistor Q is not in the short-circuit trouble (S112). Unless the voltage VP1 rises over the first set voltage VS1 by the time when the first predetermined time t1 elapses since the ignition switch IG is turned ON (S110: No), it is determined that the transistor Q is in the short-circuit trouble (S114). Next, the boosting circuit control unit 22 turns ON the transistor Q by applying a high level drive signal to the gate of the N-channel transistor Q (S116) to detect the voltage VP1 of the connecting point P1 (S118). Subsequently, the boosting circuit control unit 22 determines whether or not the voltage VP1 of the connecting point P1 drops below the second set voltage VS2 by the time when a second predetermined time elapses since the transistor Q is turned ON and at the same time, the voltage VP1 drops below the third set voltage VS3 before the transistor Q is turned ON (S120). If the voltage VP1 drops below the second set voltage VS2 by the time when the second predetermined time elapses since the transistor Q is turned ON and further the voltage VP1 drops below the third set voltage VS2 before the transistor Q is turned ON (S120: Yes), the boosting circuit control unit 22 determines that the transistor Q is not in the open trouble (S122) according to the determination result. If the voltage VP1 does not drop below the second set voltage VS2 by the time when the second predetermined time elapses since the transistor Q is turned ON or if the voltage VP1 does not drop below the third set voltage VS3 before the transistor Q is turned ON by the time when the second predetermined time elapses since the transistor Q is turned ON (S120: No), the boosting circuit control unit 22 determines that the transistor Q is in the open trouble (S124). Then, the boosting circuit control unit 22 determines that the transistor Q is not in the short-circuit trouble in S112 and if it is determined that the transistor Q is not in the open trouble in S122, the control unit 22 turns ON the power relay RL (S126) and repeats the ON/OFF operation of the transistor Q thereby, to start the boosting operation (S128). If the boosting circuit control unit 22 determines that the transistor Q is in the short-circuit trouble in S114, it displays that matter to notify a vehicle driver (S130). Further, if the boosting circuit control unit 22 determines that the transistor Q is in the open trouble in S124, it displays that matter to notify the vehicle driver (S132). To display the trouble of the transistor Q in S130 or S132, at least any one of visual display method and audio indication method may be used. As the visual display method, for example, alarm lamps for the short-circuit trouble and open trouble are provided on a vehicle instrument panel or the like and made to blink. As the audio indication method, for example, buzzers for the short-circuit trouble and the open trouble are provided and made to sound.

Operation and Effect of the Embodiment

Following operation and effect can be obtained according to this embodiment described above.

[1] In order to determine the short-circuit trouble of the transistor Q, whether or not the voltage VP1 of the connecting point P1 rises over the first set voltage VS1 by the time when the first predetermined time t1 elapses since the ignition switch IG is turned ON with the power relay RL set to OFF and the transistor Q set to OFF (S104) is determined (S110). Because if the ignition switch IG is turned ON, the internal power circuit 12 generates a voltage VC and that voltage VC is applied to the connecting point P1, current flows into the noise filter capacitor C2 from the internal power circuit 12 through the resistor R so that the noise filter capacitor C2 is precharged. That is, "by the time when the first predetermined time t1 elapses since the ignition switch IG is turned ON" means that "by the time when the first predetermined time elapses since the supply of current to the connecting point P1 from the internal power circuit 12 through the resistor R starts". At this time, when the transistor Q is in the short-circuit trouble, the voltage VP1 of the connecting point P1 is determined by the voltage Vc generated by the internal power circuit 12, the resistance of the resistor R, the DC resistance of the boosting coil L, the ON resistance of the transistor Q, the electrostatic capacity of the noise filter capacitor C2 and a passage time since the ignition switch IG is turned ON, because the connecting point P1 is grounded through the boosting coil L and the transistor Q. Further, when the transistor Q is not in the short-circuit trouble, the voltage VP1 of the connecting point P1 is determined by the voltage Vc generated by the internal power circuit 12, the resistance of the resistor R, the electrostatic capacity of the noise filter capacitor C2 and a passage time since the ignition switch IG is turned ON, because the connecting point P1 is not grounded but in the open state. That is, the voltage VP1 of the connecting point P1 follows a time constant determined by the aforementioned each resistance and the electrostatic capacity of the noise filter capacitor C2 and rises as the passage time since the ignition switch IG is turned ON increases. The degree of the rise of the voltage VP1 to the passage time since the ignition switch is turned ON when the transistor Q is not in the short-circuit trouble as compared to a case where it is in the short-circuit trouble, so that the voltage VP1 rises quickly. Then, the first predetermined time t1 and the first set voltage VS1 are obtained experimentally according to cut-and-try method by actually testing the degree of the rise of the voltage VP1 to the passage time since the ignition switch IG is turned ON for the cases where the transistor Q is in the short-circuit trouble and not in the short-circuit trouble. For example, when the voltage Vc is 5 V, the electrostatic capacity of the noise filter capacitor C2 is 1500 µF, and the resistance of the resistor R is 390 Ω, the first predetermined time t1 is set to 1 second while the first set voltage VS1 is set to 0.5 V. If the voltage VP1 rises over the first set voltage VS1 by the time when the first predetermined time t1 elapses since the ignition switch IG is turned ON (S110: Yes), it is determined that the transistor Q is not in the short-circuit trouble (S112). As described above, according to this embodiment, because whether or not the transistor Q is in the short-circuit trouble is determined based on changes in the voltage VP1 of the connecting point P1 with a time passage, which is determined depending on the charging characteristic of the noise filter capacitor C2 specified by the aforementioned time constant when the transistor Q is controlled to be OFF by interrupting a current supplied from the vehicle loaded battery B to the boosting coil L by turning OFF the power relay RL, whether or not the short-circuit trouble occurs can be determined securely and quickly. Because whether or not the transistor Q is in the short-circuit trouble is determined at the time of an initial check after the ignition switch IG is turned ON and the power relay RL is not turned ON when the transistor Q is in the short-circuit trouble (because the power relay RL is inhibited from being turned ON), fail safe treatment can be achieved.

[2] According to this embodiment, when it is determined that the transistor Q is in the short-circuit trouble, the power relay RL is turned OFF (S102). That is, before starting the boosting operation (S128) by turning ON the power relay RL (S126), the transistor Q is determined to be in the short-circuit trouble (S110). Therefore, according to this embodiment, even if the transistor Q is in the short-circuit trouble, no excessive rush current flows in a process of vehicle loaded battery B—fuse F—power relay RL—boosting coil L—transistor Q unlike the conventional chopper type DC current boosting circuit 60 when determining that the transistor Q is in the short-circuit trouble, thereby making it possible to prevent a defect in a circuit device (fuse F, power relay RL, boosting coil L) through which the rush current flows due to abnormal heating. Thus, for example, when a non-contact relay is used as the power relay RL, it is possible to prevent the semiconductor switch from turning into the open trouble or the short-circuit trouble due to the rush current. Further, because the semiconductor switch of the power relay RL is prevented from turning into the short-circuit trouble, no double defects that the semiconductor switch of the power relay RL turns into the short-circuit trouble and the fuse F melts down due to the rush current occurs. Further, when the electromagnetic relay is employed as the power relay RL, the relay contact point can be prevented from being fused by the rush current and no double defects that the relay contact of the power relay RL is fused and the fuse F melts down due to the rush current occurs.

[3] The resistor R functions as a current limiting protective resistance for preventing an excessive current from flowing from the internal power circuit 12 into the connecting point P1. In the meantime, the resistance of the resistor R may be obtained experimentally according to the cut-and-try method considering the operation of the aforementioned [1].

[4] In order to determine whether or not the transistor Q is in the open trouble, the power relay RL is turned OFF (S102) and whether or not the voltage VP1 of the connecting point P1 falls below the second set voltage VS2 by the time when the second predetermined time t2 elapses since the transistor Q is turned ON and the voltage VP1 falls from the state before the transistor Q is turned ON by more than the third set voltage VS3 (S120). At this time, although the noise filter capacitor C2 is discharged, when the transistor Q is in the open trouble, the connecting point P1 is not grounded but in the open state. Consequently, a discharge current from the noise filter capacitor C2 flows out in a process of boosting coil L—rectifying diode D—electric motor. Then, when the transistor Q is in the open trouble, the voltage VP1 of the connecting point P1 is determined depending on the voltage Vc generated by the internal power circuit 12, the resistance of the resistor R, the DC resistance of the boosting coil L, the electrostatic capacity of the noise filter capacitor C2 and the passage time since the ignition switch IG is turned ON. Further, because when the transistor Q is not in the open trouble, the connecting point P is grounded through the boosting coil L and the transistor Q, the discharge current from the noise filter capacitor C2 flows out from the boosting coil L through the transistor Q. Then, if the transistor Q is not in the open trouble, the voltage VP1 of the connecting point P1 is determined by the voltage Vc generated by the internal power circuit 12, the resistance of the resistor R, the DC resistance of the boosting coil L, the ON resistance of the transistor Q, the electrostatic capacity of the noise filter capacitor C2 and the passage time since the transistor Q is turned ON. That is, the voltage VP1 of the connecting point P1 is determined according to a time constant determined by each resistance and the electrostatic capacity of the noise filter capacitor C2. Here, the discharge current of the noise filter capacitor C2 is larger when the transistor Q is not in the open trouble than when the transistor Q is in the open trouble, because the ON resistance of the transistor Q is sufficiently smaller than the coil resistance of the electric motor. Consequently, the noise filter capacitor C2 is discharged more when the transistor Q is not in the open trouble than otherwise. Then, by testing the degree of fall of the voltage VP1 to a passage time since the transistor Q is turned ON, the second predetermined time t2, the second set voltage VS2 and the third set voltage VS3 are obtained experimentally according to the cut-and-try method for the cases where the transistor Q is in the open trouble and not in the open trouble. For example, if the voltage Vc is 5 V, the electrostatic capacity of the noise filter capacitor C2 is 1500 $\mu$F, the resistance of the resistor R is 390 $\Omega$, the second predetermined time t2 is set to 1 second, the second set voltage VS2 is set to 3 V and the third set voltage VS3 is set to 0.3 V. Then, if the voltage VP1 falls below the second set voltage VS2 by the time when the second predetermined time t2 elapses since the transistor Q is turned ON and the voltage VP1 falls from the state before the transistor Q is turned ON by more than the third set voltage VS3 (S120: Yes), it is determined that the transistor Q is not in the open trouble (S122). Because according to this embodiment, whether or not the transistor Q is in the open trouble is determined based on changes in the voltage VP1 of the connecting point P1 determined by the discharge characteristic of the noise filter capacitor C2 specified by the aforementioned time constant with a time passage, by interrupting a current supplied from the vehicle loaded battery B to the boosting coil L by turning OFF the power relay RL, whether or not the open trouble occurs can be determined securely and quickly. Then, because determination on whether or not the transistor Q is in the open trouble is carried out at the initial check time after the ignition switch IG is turned ON and the power relay RL is not turned ON when the transistor Q is in the open trouble (in order to inhibit the power relay RL from turning ON), fail safe treatment can be achieved.

[5] According to this embodiment, a determination result on the open trouble of the transistor Q can be obtained in a shorter time than the conventional chopper type DC boosting circuit 60 because the transistor Q does not perform the boosting operation by repeating the ON/OFF action unlike the conventional chopper type DC boosting circuit 60 when determining that the transistor Q is in the open trouble.

[6] According to this embodiment, upon determining whether or not the transistor Q is in the open trouble, it is determined that the transistor Q is not in the open trouble only when both the first and second conditions are satisfied. The first condition is that the voltage VP1 has fallen below the second set voltage VS2 by the time when the second predetermined time t2 elapses since the transistor Q is turned ON. The second condition is that the voltage VP1 has fallen from the state before the transistor Q is turned ON by more than the third set voltage VS3 by the time when the second predetermined time t2 elapses since the transistor Q is turned ON. Setting these two conditions enables to determine whether or not the transistor Q is in the open trouble more securely.

[7] The aforementioned patent document 1 (Japanese Patent Application Laid-Open No. 2003-89360) has disclosed an apparently similar boosting circuit to this embodiment in its $23^{rd}$ embodiment (line 339–line 368, FIGS. 38–41), the $24^{th}$ embodiment (line 368-line 377, FIGS. 38, 39, 42). However, the $23^{rd}$–$25^{th}$ embodiments in the patent document 1 are different from the chopper type DC boosting circuit 20 of this embodiment in following points and this embodiment cannot be reached easily from the patent document 1 and the patent document 1 cannot achieve the operation and effect described in the above-described [1]–[6] of this embodiment.

(7-1) The line 341 of the patent document 1 states that "if the ignition switch IGS of an ignition circuit $\phi$ is turned ON, an ignition voltage VIG is applied and according to this embodiment, the ignition voltage VIG is of the same voltage as the battery voltage." On the other hand, according to this embodiment, the voltage VC gained by lowering the voltage VB of the vehicle loaded battery B is applied to the connecting point P1(equivalent to the connecting point P5 in the patent document 1).

(7-2) The line 341 of the patent document 1 states that a resistor R1 is connected between the connecting point P4 of the ignition circuit $\phi$ and the connecting point P5 of an application point P1 and a coil L and the resistor R1 has a high resistance hardly allowing a current to flow between the connecting points P4 and P5. That is, according to the patent document 1, the capacitor C2 is not charged because no current flows from the ignition circuit $\phi$ into the capacitor C2 through the resistor R1 when the power relay 200 shown in FIG. 38 is turned OFF. On the other hand, according to this embodiment, when the power relay RL is OFF, a current flows into the noise filter capacitor C2 from the internal power circuit 12 (equivalent to the ignition circuit $\phi$ in the patent document 1) through the resistor R (equivalent to the resistor R1 in the patent document 1), so that the noise filter capacitor C2 is charged.

(7-3) According to the patent document 1, a boosting circuit control unit 20 shown in FIG. 39 detects a drain voltage of the transistor Q1. On the other hand, in this embodiment of the present invention, the boosting circuit control unit 22 detects the voltage VP1 of the connecting point P1.

(7-4) According to the $23^{rd}$ embodiment of the patent document 1, whether or not the drain voltage of the transistor Q1 is over a sixth reference value $\lambda.6$ is determined in S440 shown in FIGS. 40, 41 and if the drain voltage is less than the sixth reference value $\lambda.6$, it is determined that the transistor Q1 is not in the open trouble. On the other hand, according to this embodiment, as described in detail in the [4], whether or not the transistor Q (equivalent to the transistor Q1 in the patent document 1) is in the open trouble is determined based on changes in the voltage VP1 of the connecting point P1 determined by the discharge characteristic of the capacitor C2 with a time passage.

Thus, according to this embodiment, whether or not the transistor Q (Q1) is in the open trouble can be determined more securely and quickly as compared to the patent document 1.

(7-5) According to the 24$^{th}$ embodiment of the patent document 1, whether or not the drain voltage of the transistor Q1 is less than a seventh reference value λ7 is determined in S440A shown in FIG. 42 and if the drain voltage exceeds the seventh reference value λ7, it is determined that the transistor Q1 is not in the short-circuit trouble. On the other hand, according to this embodiment, as described in detail in the [1], whether or not the transistor Q is in the short-circuit trouble is determined based on changes in the voltage VP1 of the connecting point P1 determined by the charge characteristic of the capacitor C2 with a time passage. Thus, this embodiment enables to determine whether or not the transistor Q (Q1) is in the short-circuit trouble more securely and quickly than the patent document 1 says.

Another Embodiment

The present invention is not restricted to the above-described embodiment and may be embodied as follows. In this case, the same or higher operation and effect as and than the respective embodiments can be obtained.

[1] The rectifying diode D is replaced with such a switching device as a transistor like the above-described patent document 1 (Japanese Patent Application Laid-Open NO. 2003-89360) and the boosting operation is carried out by turning ON/OFF the switching device and transistor Q alternately. Consequently, a regenerative current of the electric motor of the EPS can be regenerated and if the electric motor is in the regenerative condition, the chopper type DC boosting circuit is prevented from being destroyed.

[2] The transistor Q may utilize any switching device such as P-channel power MOSFET, junction FET (JFET), insulated gate bipolar transistor (IGBT), static induction transistor (SIT), bipolar transistor, thyrister as well as the N-channel power MOSFET.

[3] The chopper type DC boosting circuit 20 may be applied to not only the EPS but also any apparatus as long as it needs direct current boosting.

Although the invention has been disclosed in the context of a certain preferred embodiment, it will be understood that the present invention extends beyond the specifically disclosed embodiment to other alternative embodiment of the invention. Thus, it is intended that the scope of the invention should not be limited by the disclosed embodiment but should be determined by reference to the claims that follow.

What is claimed is:

1. A trouble determining apparatus for a chopper type DC boosting circuit comprising:

an inductor through which a current supplied from a DC power supply flows;

a switching device for interrupting a current flowing to the inductor by opening or grounding the side opposite to said DC power supply of the inductor;

a rectifier for rectifying a discharge current generated by back electromotive force of said inductor;

a first capacitor for smoothing a current rectified by the rectifier; and a control means for controlling the switching of said switching device so that a between-terminal voltage of the first capacitor turns to a target voltage, said trouble determining apparatus further comprising:

an interrupting means for interrupting the supply of current from said DC power supply to said inductor;

a current supplying means for supplying a DC current to the side of said DC power supply of said inductor;

a second capacitor for charging with a current supplied from the current supplying means; and a short-circuit trouble determining means in which said interrupting means interrupts a current supplied from said DC power supply to said inductor and when said control means controls said switching device to turn OFF, determines whether or not said switching device is in the short-circuit trouble based on changes in voltage between terminals of said second capacitor determined by the charge characteristic of said second capacitor with a time passage.

2. A trouble determining apparatus for a chopper type DC boosting circuit comprising:

an inductor through which a current supplied from a DC power supply flows;

a switching device for interrupting a current flowing to the inductor by opening or grounding the side opposite to said DC power supply of the inductor;

a rectifier for rectifying a discharge current generated by back electromotive force of said inductor;

a first capacitor for smoothing a current rectified by the rectifier; and a control means for controlling the switching of said switching device so that a between-terminal voltage of the first capacitor turns to a target voltage, said trouble determining apparatus further comprising:

an interrupting means for interrupting the supply of current from said DC power supply to said inductor;

a current supplying means for supplying a DC current to the side of said DC power supply of said inductor;

a second capacitor for charging with a current supplied from the current supplying means; and a open trouble determining means in which said interrupting means interrupts a current supplied from said DC power supply to said inductor and when said control means controls said switching device to turn ON, determines whether or not said switching device is in the open trouble based on changes in voltage between terminals of said second capacitor determined by the discharge characteristic of said second capacitor with a time passage.

3. The trouble determining apparatus for DC boosting circuit according to claim 1 wherein by the time when a first predetermined time elapses since the supply of current from said current supply means starts, said short-circuit trouble determining means determines that said switching device is not in the short-circuit trouble when the between-terminal voltage of the second capacitor rises over a first set voltage.

4. The trouble determining apparatus for DC boosting circuit according to claim 2 wherein said open trouble determining means determines that said switching device is not in the open trouble if the between-terminal voltage of the second capacitor falls below a second set voltage by the time when a second predetermined time elapses since said control means controls said switching device to turn ON and the between-terminal voltage of the second capacitor falls from a state before the switching device is controlled to be ON by more than a third set voltage.

* * * * *